US010889100B2

(12) United States Patent
Krümpelmann et al.

(10) Patent No.: US 10,889,100 B2
(45) Date of Patent: Jan. 12, 2021

(54) METHOD FOR PRODUCING AN IMAGE STRUCTURE

(71) Applicant: Windmöller & Hölscher KG, Lengerich (DE)

(72) Inventors: Martin Krümpelmann, Lengerich (DE); Frank Gunschera, Osnabrück (DE); Björn Weidmann, Osnabrück (DE)

(73) Assignee: Windmöller & Hölscher KG, Lengerich (DE)

( * ) Notice: Subject to any disclaimer, the term of this patent is extended or adjusted under 35 U.S.C. 154(b) by 132 days.

(21) Appl. No.: 15/489,558

(22) Filed: Apr. 17, 2017

(65) Prior Publication Data

US 2017/0217148 A1    Aug. 3, 2017

Related U.S. Application Data

(63) Continuation of application No. PCT/EP2015/073765, filed on Oct. 14, 2015.

(30) Foreign Application Priority Data

Oct. 16, 2014    (LU) .......................... 92574

(51) Int. Cl.
  *B29C 70/74*    (2006.01)
  *B41M 1/30*    (2006.01)
  (Continued)

(52) U.S. Cl.
  CPC ............ *B41C 1/05* (2013.01); *B29C 37/0025* (2013.01); *B29C 64/106* (2017.08);
  (Continued)

(58) Field of Classification Search
  CPC . B29C 37/0025; B29C 64/106; B29C 64/112; B29C 64/118; B29C 70/74;
  (Continued)

(56) References Cited

U.S. PATENT DOCUMENTS 6,070,528 A    6/2000 Fleischmann et al.
2002/0040653 A1    4/2002 Gottling et al.
  (Continued)

FOREIGN PATENT DOCUMENTS

CN    2247070    2/1997
CN    2439923    7/2001
  (Continued)

OTHER PUBLICATIONS

Chinese Patent Application No. 201580062718.6 filed Oct. 14, 2015 in the name of Windmöller & Hölscher KG, Office Action dated Jul. 16, 2018.
  (Continued)

*Primary Examiner* — Leo B Tentoni
(74) *Attorney, Agent, or Firm* — Levine Bagade Han LLP

(57) ABSTRACT

The invention relates to a method (100) for producing an image structure (12) according to an image specification (20), in particular for a letterpress process and/or intaglio printing process, characterized in that the following steps are carried out: a) providing a base (10) for receiving the image structure (12), b) producing an image structure (12) on the base (10) so that an image layer (11) is formed on the base (10) by means of the image structure (12).

5 Claims, 11 Drawing Sheets

(51) Int. Cl.
  B41C 1/05      (2006.01)
  B41C 1/02      (2006.01)
  B41C 1/04      (2006.01)
  B29C 64/386    (2017.01)
  B29C 64/153    (2017.01)
  B41C 1/10      (2006.01)
  B41M 7/00      (2006.01)
  B29C 64/112    (2017.01)
  B29C 64/118    (2017.01)
  B29C 64/106    (2017.01)
  B29C 37/00     (2006.01)
  B33Y 10/00     (2015.01)
  B33Y 30/00     (2015.01)
  B33Y 50/02     (2015.01)
  B41C 1/00      (2006.01)
  B29C 71/00     (2006.01)
  B29L 31/00     (2006.01)

(52) U.S. Cl.
  CPC .......... *B29C 64/112* (2017.08); *B29C 64/118* (2017.08); *B29C 64/153* (2017.08); *B29C 64/386* (2017.08); *B29C 70/747* (2013.01); *B33Y 10/00* (2014.12); *B33Y 30/00* (2014.12); *B33Y 50/02* (2014.12); *B41C 1/003* (2013.01); *B41C 1/02* (2013.01); *B41C 1/04* (2013.01); *B41C 1/1008* (2013.01); *B41C 1/1016* (2013.01); *B41C 1/1066* (2013.01); *B41M 7/0081* (2013.01); *B29C 2071/0027* (2013.01); *B29L 2031/767* (2013.01)

(58) Field of Classification Search
  CPC ........... B29C 70/747; B29C 2071/0027; B29L 2031/767; B41C 1/003; B41C 1/008; B41C 1/0016; B41C 1/0066; B41M 1/30; B41M 7/0081
  USPC .......... 264/129, 134, 139, 232, 308
  See application file for complete search history.

(56) References Cited

U.S. PATENT DOCUMENTS

| | | | |
|---|---|---|---|
| 2008/0156212 A1 | 7/2008 | Yamada et al. | |
| 2010/0007692 A1* | 1/2010 | Vanmaele | B41C 1/003 347/21 |
| 2010/0196827 A1* | 8/2010 | Leenders | B41C 1/003 430/306 |
| 2015/0321497 A1* | 11/2015 | Lingier | B41C 1/003 101/401.1 |

FOREIGN PATENT DOCUMENTS

| | | |
|---|---|---|
| CN | 1754694 | 4/2006 |
| CN | 101480889 | 7/2009 |
| CN | 101500817 | 8/2009 |
| CN | 102119080 | 7/2011 |
| CN | 102229280 | 11/2011 |
| DE | 10162660 | 7/2003 |
| EP | 2153991 | 2/2010 |
| EP | 2371541 | 10/2011 |
| EP | 2420382 | 2/2012 |
| EP | 2746058 | 6/2014 |
| GB | 1546532 | 5/1979 |
| JP | S52-132906 | 11/1977 |
| JP | H10-058814 | 3/1998 |
| JP | 2002-178481 | 6/2002 |
| JP | 2006-334904 | 12/2006 |
| JP | 2007-168246 | 7/2007 |
| JP | 2010-089461 | 4/2010 |
| JP | 2012-512762 | 6/2012 |
| JP | 2013-527810 | 7/2013 |
| WO | WO 2005/095115 | 10/2005 |
| WO | WO 2010/069749 | 6/2010 |
| WO | WO 2011/120831 | 10/2011 |

OTHER PUBLICATIONS

Luxumbourg Patent Application No. 92574 filed Oct. 16, 2014 in the name of Windmöller & Hölscher KG, Search Report and Written Opinion dated Jun. 29, 2015.

PCT International Patent Application No. PCT/EP2015/073765 filed Oct. 14, 2015 in the name of Windmöller & Hölscher KG, International Search Report dated Dec. 21, 2015.

PCT International Patent Application No. PCT/EP2015/073765 filed Oct. 14, 2015 in the name of Windmöller & Hölscher KG, International Preliminary Report on Patentability dated Apr. 27, 2017.

* cited by examiner

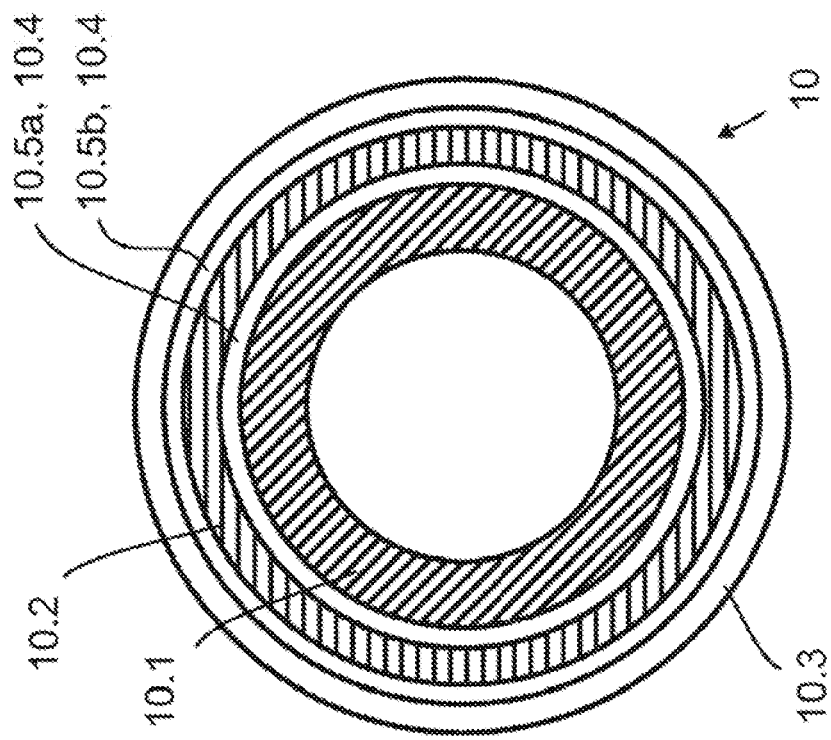
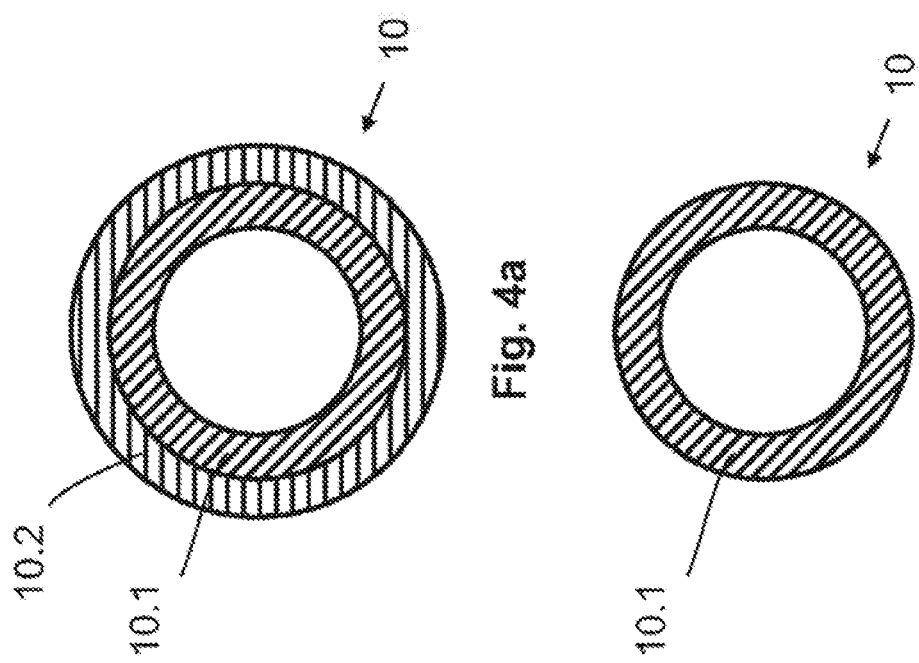

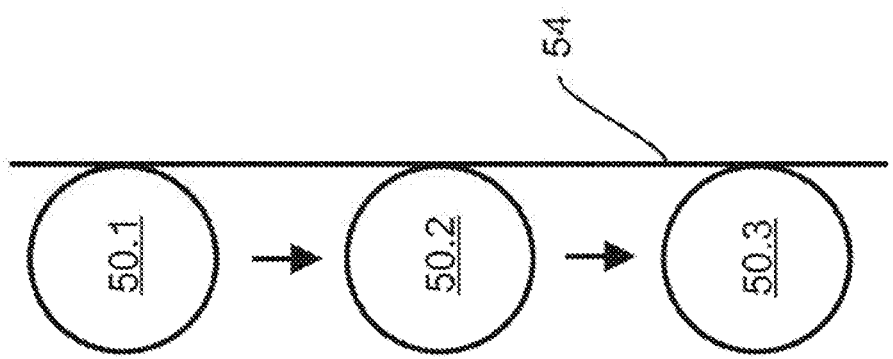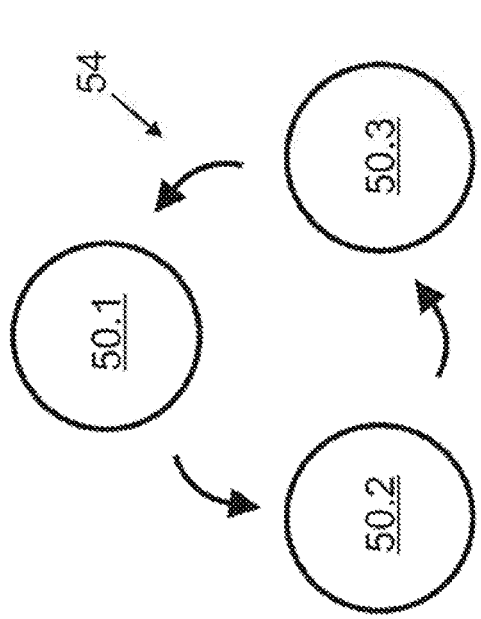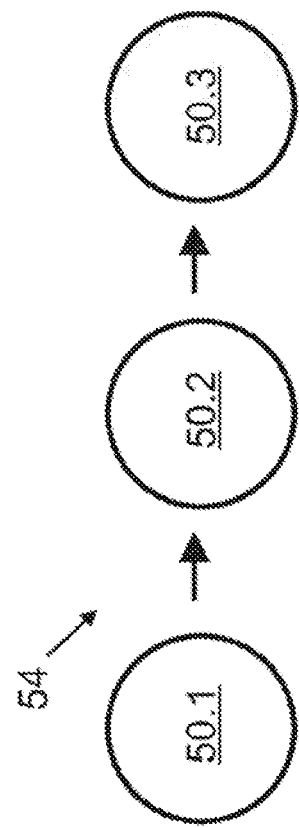

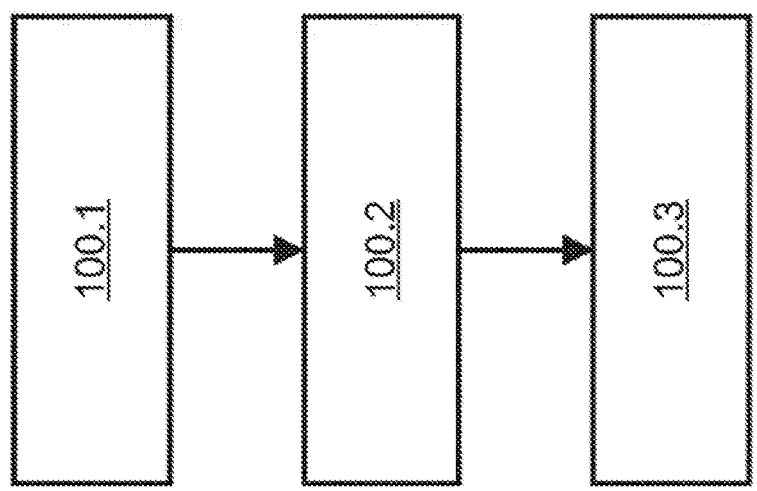

METHOD FOR PRODUCING AN IMAGE STRUCTURE

CROSS-REFERENCE TO RELATED APPLICATIONS

This application is a continuation of International Application No. PCT/EP2015/073765, filed Oct. 14, 2015, which claims priority to Luxembourg Patent Application No. 92574, filed Oct. 16, 2014, both of which are incorporated by reference herein in their entireties.

BACKGROUND

1) Technical Field

The invention relates to a method for producing an image structure in a manner defined in the preamble of claim 1. Further, the invention relates to a method according to claim 7 and a printing form machine according to claim 23.

2) Description of the Related Art

In the printing industry different methods for printing are known in order to transfer motives as a print image to a printing substrate like for example paper or film. Thereby intaglio printing or letterpress printing methods are a possibility for printing, wherein with a letterpress printing like the flexoprint the elevated positions of the printing plate configures the image. As printing plates for example clichés or pressure plates are used which comprise the print image and can transfer the print image via an image structure. Therefore, normally the clichés or printing plates are glued to base bodies like sleeves (for example Sleeves). The printing plate for example comprises a carrier film or layer on which a print image layer for example a photopolymer is applied. The image structure can thereby for example be generated by introducing a print relief, for example by illumination on a photopolymer for example on the print image layer (the print relief thereby configures the image structure). The resulting printing plates (consisting of carrier layer and image structure) are subsequently glued to the sleeve or to the base body, particularly with adhesive tapes.

Thereby, the disadvantage has turned out that for known methods for producing the image structure an extensive production and arrangement of the printing plates at the base body is necessary. A flexible adjustment or alteration of the print image or the printing plate is thereby complicated in the printing process, since initially a new image structure particularly separately from the base body has to be produced with a high effort, which subsequently is arranged at the sleeve or the base body. The used methods for producing an image structure are thereby time and cost efficient and often comprise a high material consumption and moreover require possibly a plurality of operating processes which have to be performed with different devices, wherein known methods are often not flexibly and quickly usable.

It is therefore the object of the present invention to at least partially avoid the previously described disadvantages. Particularly, methods for producing an image structure and a printing form machine shall be proposed which are suitable for a fast, cheap and flexible use in the printing process for producing an image structure.

SUMMARY OF THE INVENTION

The previous object is solved by a method for producing an image structure with the features of claim 1 and a method for producing an image structure with the features of claim 7 and a printing form machine for producing an image structure with the features of claim 23. Further features and details of the invention result from the respective dependent claims, the description and the drawings. Thereby features and details which are described in relation to the method according to the invention naturally also apply in relation to the printing form machine according to the invention and vice versa such that according to the disclosure of the single aspects of the invention it can always be reciprocally related to.

The method according to the invention serves for the production of an image structure according to a print image specification particularly for a letterpress printing and/or intaglio printing and particularly for the flexoprint. According to the invention thereby the following steps are performed:

a) Providing a base body for the acceptance of the image structure, b) Producing an image structure on the base body such that a print image layer is generated with the image structure on the base body.

Therewith a fast and flexible generation or application of the image structure particularly directly and immediately on the base body is enabled such that an intensive separate production and application of the printing form to the base body can be avoided. Preferably, the production of the image structure therewith occurs such that the print form arises with the application of the image structure to the base body (instead of normally initially separately produced and subsequently applied). The print image layer is thereby particularly a layer from a material (for example from a printing form machine according to the invention applied to the base body) which after production of the image structure for example is structured such that (with a relief) that the print image according to the print image such that the image structure according to the print image specification can be transferred to a printing substrate. Thereby for example colour is transferred to the printing substrate by the image structure in a printing machine such that a copy of the print image specification or the print image results on the printing substrate. Preferably, the print image layer is configured such that the Print image structure results (for example by application of the material at certain positions of the base body). Alternatively, the print image layer can be existent without image structure or can be initially easily applied wherein the image structure is only configured in a second step from the print image layer (or the material). The print image layer thereby comprises particularly the image structure. The base body can for example be a sleeve particularly a Sleeve, a carrier layer and or a basis for an additive production method.

The print image layer and/or the image structure can particularly by configured or be complied partially, completely and/or layerwise to the base body. The term "layerwise" thereby relates to the fact that the print image layer and/or the image structure are applied layerwise and/or comprise multiple layers. Hereby the advantage is achieved that an expensive separate production of the print image layer for example as a printing plate in the subsequent extensive mounting can be avoided since the image structure is directly applied to the base body.

The base body is thereby preferably configured cylindrical such that it is suitable for pushing on the mandrel (for example a printing machine or an acceptance of an printing form machine according to the invention) and particularly for the configuration of a print form cylinder. Thereby, the base bode can comprise a sleeve particularly a Sleeve, which is for example configured from glass fibre reinforced plastic or carbon fibre reinforced plastic. Hereby the sleeve comprises particularly the advantages like a high resistance and stability. Further, it is possible that the sleeve is configured from epoxy resins or polyester resins (for example reinforced with glass fiber tissue) from an elastic component or other polymers. Thus, the elastic possibilities of the sleeve can be adjusted for the use in a certain printing machine and predefined parameters. Further, the sleeve can be coated with elastomer components like rubber or polyurethane. The wall thickness of the sleeve can thereby for example be 0.15 mm to 3 mm and particularly 0.5 mm to 2 mm. Since the sleeve has to be applied to a mandrel within the scope of the printing process, wherein the sleeve for pushing on and pulling off is for example impinged with compressed air, it can be suitable for a widening up by compressed air and comprise a sufficient flexibility. For example the sleeve can be suitable to be widened up with an air pressure of for example 6 to 12 bar. For pushing on it is further an advantage when the sleeve comprises a flexible layer at its inner surface. Hereby a simple mounting at the mandrel is enabled.

Likewise a method for producing a image structure according to a print image specification is subject matter of the invention, particularly for a letterpress method and/or intaglio printing method and particularly for a flexoprint. Thereby, it is provided that the image structure is additively generated by a print image machine according to the invention, particularly a 3D-printer. The term additive thereby describes particularly that the image structure or the material of the image structure is additively applied, particularly to a base body, particularly by an additive production method. The image structure is preferably additively generated by applying the material of the material layers completely, partly and/or layerwise and thus the image structure is configured by the resulting elevated positions (the relief). The generation of the image structure thereby occurs for example by a print image machine according to the invention, particularly a 3D-printer, which is for example suitable to perform an additive production method.

It is further an advantage when the image structure is generated on a base body particularly on a carrier layer of the base body. Therewith the separate method step of glueing of the image structure on the base body is omitted, like on a sleeve or a Sleeve, and the image structure can therewith be quickly used for the use in the print image machine. The image structure can alternatively be generated without the base body for example also on a carrier layer and in this manner a separate print form can be configured (consisting of a carrier layer and a image structure). This printing form can subsequently be applied to the base body for example by glueing. Likewise it is possible that the image structure is generated directly on the base body or the carrier layer with the base body and is generated particularly layerwise, meaning configured successive from multiple layers.

In a further possibility within the scope of the invention it can be provided that the image structure particularly on a carrier layer is generated by configuring the image structure as a separate print image layer and applicable on a base body. The application on the base body can thereby occur for example manually by a user or automatic by a printing form machine according to the invention. Therewith the image structure is generable, transportable and processable also without a base body, wherein for example a higher flexibility and an easier processing is enabled. The generated print image layer with the image structure can for example be glued on the base body by the use of glue and/or a double-sided adhesive tape. Likewise, the use of magnetism is possible in order to attach the print image layer with the image structure. Therewith the print image layer configures for example a cliché or printing plate mountable manually to the base body.

It is further possible that an elastic layer and/or a carrier layer is generated by the printing form machine according to the invention and the elastic layer and/or the carrier layer are applied with the print image layer to the base body. Thereby the elastic layer and/or the carrier layer can for example be generated likewise additive or according to a subsequently described processing method by a printing form machine according to the invention. Subsequently if necessary the printing layer can, particularly with the image structure, be applied to the carrier layer. The printing layer particularly comprises a lower stability than the carrier layer in order to therewith ensure an optimal contact pressure with the printing process.

The following described features and details and the dependent claims have preferable embodiments of the invention particularly the method according to the invention and the printing form machine according to the invention.

Preferably, the base body serves as an acceptance (meaning particularly for fixing or adherence) of the image structure, particularly for the flexoprint. The base body comprises particularly a sleeve, in particular a Sleeve, which is preferably suitable for pushing on a mandrel. On the sleeve for example an elastic layer is applied, which serves particularly for adhesion of the outer carrier layer. Preferably, the base body comprises an outer carrier layer, wherein the carrier layer is configured such that the image structure is applicable or the carrier layer is adherable and can configure a print form particularly by application of the image structure on the carrier layer. Hereby therewith the advantage is achieved that the base body comprises already a carrier layer for the acceptance of the image structure particularly a print image layer with the image structure. Hereby it is particularly possible to resign a separate production of a print form (or a cliché), which comprises the carrier layer and the image structure. In the printing process thereby the printing form can be configured directly in or on the base body for example thereby that only the image structure is applied. This is achieved in that the carrier layer is already provided at the base body and therewith configures together with the applicable image structure the printing form (for example as a print image layer). The generation of the image structure and the application on the base body can occur if necessary due to the configuration of the base body as a single method step. This provides significant advantages particularly in comparison with a separate production of the printing form and a subsequent adhesion to the base body, since the print image and image structure can be applied or adjusted flexibly, fast and individually directly on the carrier layer of the base body. The base body can further subsequently be used for the further printing process.

It is further possible that according to step b) initially a material is applied to the base body, particularly as a layer and subsequently is finished such that the image structure results particularly by 3D-print method and/or by graving. Therewith a image structure can be flexibly and fast generated on the base body, which corresponds to a print image specification and is directly usable for the further printing process. As a material for example a polymer can be used which is applied as a layer and/or layerwise. Further, other materials can be used as a material for the generation of the image structure, which are subsequently described in detail. The print image layer with the image structure hereby particularly results in that by a production method the material, particularly the polymer layer, is altered. The application of the material or the material layer can thereby occur partly, completely and/or layerwise to the base body. Contrary to the partial application with a complete application the material is mainly applied to the whole surface of the base body. It is further possible that for the application the material or the material layer is applied and/or glued partially automatically by a printing form machine according to the invention or at least partly manually. Thereby the image structure is suitable for the configuration of a letterpress form and/or intaglio printing form. According to the specification (for example by digital parameters) for example a material can be chosen dependent on a letterpress form or a gravure press form. The material can thereby for example comprise an elasticity according to the specification. The printing form thereby comprises thereby particularly the generated image structure together with the carrier layer.

Preferably within the scope of the invention it can be intended that according to step b) the image structure is generated in a printing form machine particularly according to the invention by a processing device particularly of the printing form machine according to the invention. The processing device can thereby preferably be suitable for a production method, which enables a fast and efficient generation of the image structure particularly directly or unambiguously at the base body. By the use of the printing form machine according to the invention a for example by an integration of the printing form machine according to the invention in a printing machine the method according to the invention can be used for a plurality of different printing processes and printing machines. Preferably it is provided thereby that the image structure is applicable by a production method particularly by a 3D-printing method with the printing form machine according to the invention. The printing form machine can thereby for example be configured as a 3D-printer. Such devices can for example generate material, three-dimensional objects on the basis of digital CAD- (Computer Aided Design) data. The data thereby provides specifications for the image structure, which for example appear in STL (Surface Tessellation Language) format or in another data format. The printing form machine can thereby for example produce the object or the image structure by an additive and/or by a subtractive production method for example by a layerwise composition of the image structure. Hereby a cost-efficient and flexible production of the image structure is enabled.

It is further possible that the printing form at the base body is directly produced at the printing machine wherein the printing process is further accelerated and costs can be reduced. This is among others possible since the normal printing process mainly remains unaltered and no extensive adjustments for the use of the base body with a method according to the invention is necessary. It is for example sufficient for the production of the printing form to use a printing form machine according to the invention which directly applies the image structure to the base body. Likewise for example an application of the image structure can occur and/or an existing image structure or print image layer can be adjusted in that for example material is altered, applied and/or removed by the printing form machine according to the invention. The printing form machine according to the invention can thereby for example be suitable for the performance of additive productions methods (like 3D-printing, electron beam melting, laser melting, stereolithography, selective laser melting, sintering, laser sintering) and/or subtractive production methods (like removing, laser removing, thermal separation, electron beam separation) and/or graving (laser graving) and/or forming process.

It is likewise an advantage, when according to step a) a removing- and/or cleaning process is performed. The removing and/or cleaning process can for example occur automated for example by a printing form machine according to the invention such that hereby no separate working steps are necessary. For an optimal application and/or generation of the image structure to the base body thereby initially a particularly complete removal of an already existing image structure of the base body occurs, if necessary. By the cleaning process the base body can if necessary be prepared after the removal for the acceptance of the image structure. This can for example be by a cleaning with chemical and/or solvents in order to remove dirt and/or remains of a previous image structure. It is possible that the removal and/or cleaning process comprises a treatment of the base body surface which optimizes the adhesion of the image structure. This can for example be the application of adhesive material. For the performance of the removing- and/or cleaning process the printing form machine according to the invention comprises for example a cleaning unit and/or a removing unit. The removing and/or cleaning meaning particularly the removing of the material of a previous image structure from the base body can for example occur mechanically, meaning chipped or chiselled. Likewise a chemical removal for example with solvents is possible. Hereby a reliable preparation of the base body for the further methods steps is enabled.

Further it can be intended within the scope of the invention that after step b) a post-processing of the image structure occurs wherein particularly the print image layer is post-processed with the image structure by a grinding process. Such a post-processing of the image structure particularly serves for graving of the surface in order to therewith achieve better printing results. The post-processing can thereby for example comprise for example by a removal- or a cleaning process by a rinsing of not necessary material of the image structure for example by solvents and for example also the removal of non-printable areas. The removal and/or cleaning can thereby likewise automatically occur by a removal- and/or cleaning unit of a printing form machine according to the invention.

According to a further advantage within the scope of the invention it can be provided that according to step b) an elastic layer and/or a carrier layer is applied to the base body, wherein particularly the image structure is generated on the carrier layer. The application of the elastic layer and/or carrier layer can thereby for example occur automized by a printing form machine according to the invention. This has the advantage that the base body is already prepared, so it can receive the image structure and can be used for a printing process at the printing machine. The elastic layer can thereby for example comprise a polymer, foam material, adhesive material and/or a double-sided adhesive tape. The carrier layer can for example be configured by PET (polyethylene terephthalate). Thereby for example initially a foam band (meaning the elastic layer which is configured for example from foam material) and then the carrier layer are applied wherein these subsequently can receive the material for the configuration of the print image layer with the image structure. Likewise it is possible that the selection of the material for the elastic layer and/or carrier layer and/or the print image layer occurs in dependence on a specification for example by the printing form machine according to the invention. The specification can thereby for example comprise if a printing form should be produced for the letterpress method and/or intaglio printing method. Likewise this specification can for example be adjusted to digital parameters like it is subsequently described in detail.

Further the carrier layer can be preferably configured such that it is suitable as a base or basis for the performance of additive processing methods, particularly 3D-printing, subtractive processing methods, particularly laser removal, graving, particularly laser graving and/or forming process and for the application or acceptance of the image structure configured hereby. Therefore the carrier layer comprises for example a roughened surface and a heat resistance, melting point and/or stability adjusted to the processing method. Hereby the resistance of the carrier layer is increased in order to withstand conditions with the application of the image structure, like a high temperature.

Preferably within the scope of the invention it can be intended that the image structure is generated by a processing method, particularly an additive and/or subtractive processing method, a 3D-printing method and/or by graving, from a material. Therewith an image structure can be generated flexibly and adjusted to different requirements which with different printing methods enable optimal printing results. Thereby additive processing methods particularly are positive processing methods which are particularly based on the fact that by the application of material the image structure results. On the contrary, the subtractive processing method name particularly negative methods, wherein here the image structure results from a removal of material. Additive processing methods are thereby for example 3D-printing methods, electron beam melting, laser melting (selective laser melting), stereolithography, laser sintering or selective laser sintering, fused deposition modeling (melting layers), laminated object molding, cool gas injection or such like. The subtractive processing methods thereby identify particularly the removal (like for example laser cutting, laser beam melting cutting and other methods), laser removal, laser drilling, plasma cutting, chipping methods, thermal separation, electron beam separation and/or such like. The processing methods can thereby preferably be suitable for rapid prototyping. Likewise the graving or the direct graving can if applicable be related to the negative processing methods. Further it is possible that for the generation of the image structure a processing method like for example the forming process is used. The selection and the manner of the application of the material occurs to the base body thereby particularly in relation to the used processing methods, for example by means of the specification or digital parameters. Thereby it is possible that for example for direct graving the material is configured as a material layer (print image layer) on the base body and for example a graving on this material layer occurs by the printing form machine according to the invention. The generation of the image structure can further for example occur such that a polymerisation of the material, particularly on the base body, is affected for example by warmth, light, radiation, hardening of a hot glue, laser sintering and/or an inject-adhesive. Preferably herefore 3D-printing method can be used wherein for example according to a (digital) print image specification a printing form machine according to the invention heats the material, which is melted thereby and then for example applied layerwise to the base body and/or to a carrier or a basis and therewith layerwise configures the image structure. The material can thereby for example be added to the printing form machine according to the invention filamentously or as a filament. By the use of an additive processing method thereby fast 3D-image structures can be generated with only a small material use, wherein with the subtractive processing method often a higher material loss has to be accepted, since the material has to be taken away for the generation of the image structure. By subtractive processing methods or by graving and particularly laser graving fast qualitatively high quality image structures can be generated. Thereby a printing form machine according to the invention can if necessary perform a method according to the invention and different processing methods in a combined manner.

It is further possible that the image structure is generated in a first step by pre-processing particularly by an additive processing method and in a subsequent second step by a fine finishing and/or a graving, particularly by a chipping and/or subtractive processing method. Therewith for example with only one machine image structures can be produced according to a specification in different qualities and within different time parameters. By the described combination of processing methods thereby the result can be optimally controlled. The pre-processing and/or the fine finishing can thereby particularly be performed according to the previously described processing method, wherein for example during the pre-processing another processing method can be used as a fine finishing. The graving can thereby occur as a direct graving meaning directly on the base body which comprises the material layer. The graving can for example be a fine graving for example with a laser. Hereby particularly fine structures of the image structure can be configured with a high precision.

Further it is possible that the image structure is generated by a lasering of material wherein particularly the material is removed particularly by chipping previous to the lasering. Hereby particularly the speed of the generation of the image structure can be increased since for example initially the rough structure of the material is chippingly removed and subsequently lasered for the fine structure.

According to a preferred improvement of the method according to the invention it can be provided that for the generation of the image structure particularly with a pre-processing initially a material is applied and subsequently particularly by UV-light and/or electron beam hardening is hardened. By the hardening particularly a polymerization of the material can occur. This has the advantage that the material initially can be applied for example with a high speed fluidly or viscously and subsequently the structure is generated that particularly according to the print image specification the material is irradiated and thereby hardened at certain positions by light particularly UV-light.

Further it can be an advantage within the scope of the invention that the image structure is directly generated in a printing machine on the base body wherein particularly the base body is mounted on a mandrel of the printing machine. The method according to the invention can therewith particularly be directly performed at the base body which is assembled in the printing machine and particularly at the mandrel of the printing machine. The base body therewith does not have to be removed from the mandrel and can subsequently to the generation of the image structure directly be used for the printing process. Herefore for example a printing form machine according to the invention can be used in the printing machine or in a pre-processing and/or retaining station which can preferably serve as storage. Hereby significant advantages in speed result by the adjustment or renewal of the image structure.

In a further possibility a material for the generation of the image structure can be applied by an application method particularly by extruding, spraying, sintering, slit nozzle coating, casting, filling, doctoring and/or glueing. Thereby an extruder can be provided for the printing form machine according to the invention which is moveable for example at different positions at the base body in order to apply the material according to the application method. Further, for the performance of the application method a layer application unit of the printing form machine according to the invention can be provided. Hereby with a high accuracy for example layerwise the material can be applied for the configuration of the image structure to the base body and/or to a carrier layer. Particularly by spraying thereby an even print image layer can be generated on the base body. By sintering even with lower temperatures than with melting (underneath the melting temperature of the material) the image structure can be configured from the material. Therewith for example the carrier layer of the base body can comprise a lower heat-resistance and can be protected from damages. By the use of the slit nozzle coating layer thicknesses for example the print image layer can be exactly determined. Further, the described application method is characterized in that it has a simple and cost-efficient use particularly the casting, filling, doctoring and/or gluing. For the further simplification such application methods like for example the gluing can be performed manually. Likewise it is possible that the described application methods for applying a carrier layer, the elastic layer and/or the print image layer can be used.

Preferably within the scope of the invention it can be intended that a triggering of an editing device and/or the selection of a material for the generation of the image structure is adjusted to digital parameters wherein particularly the digital parameters can be contactlessly transferred from the base body. The editing device can thereby particularly be provided at a printing machine according to the invention wherein for example by the editing device and/or the print machine according to the invention the digital parameters are receivable from the base body. Thereby the base body transfers for example digital parameters via a radio connection to a communication device of the printing form machine according to the invention. The base body for example is in contactless connection with the printing form machine according to the invention in order to send and receive for example data via a bidirectional data transmission. The data and/or digital parameter can thereby comprise production parameters, the cross-section of the base body, the base body of the printing cylinder or the mandrel, values of the production tolerances, the maximum contact pressure, data of the printing machine, a distinct number for identifying the base body or the sleeve and/or such like. Likewise the data and/or digital parameters can comprise the print image or the print image specification which is therewith transmittable via the communication device to the printing form machine according to the invention for generating a image structure. In this manner the digital parameter and/or the transferred data are suitable to control a method according to the invention and to adjust it to different requirements. Further it is possible that the data are transferred from the base body and/or the printing form machine according to the invention to a printing machine. In this manner an efficient automation can be realised.

In a further advantage the image structure can be configured from a material particularly from a multi-component product, a polymer, corn starch, hot glue, an elastomer, EPDM (Ethylene-Propylene-Diene-Rubber), rubber and/or powder. Thereby the multi-component product can be for example produced by a multi-component injection molding and therewith from different kinds of plastic. This has the advantage that the material properties can be exactly predetermined. Corn starch thereby is particularly suitable for the production of filaments for the 3D-printing method and has the advantage to be eco-friendly and biodegradable. Further it can be advantageous for the use with a 3D-printing method since with cooling down it shrinks less and therewith improved products are realisable. Further it is possible that the material is an ABS (Acrylonitrile-Butadiene-Styrene) or a synthetic terpolymer which is a particular form-stable and weather resistant material. In order to reduce a material shrinking it can be provided that a base for example for the 3D-printing method and/or the carrier layer and/or the base body are preheatable and are preheated to a temperature of particularly 80° C. to 110° C. Preferably the preheating is performed previous to an application of the print image layer and/or the configuration of the image structure. Likewise the material can if necessary be from PLA (Polyactic-Acid) wherein hereby the material is heated for the generation of the image structure particularly to 180° C. to 230° C. in order to fluidly apply to the carrier layer and/or the base body. Therewith the PLA has the advantage that it possesses a high UV-resistance and a small inflammableness. The advantage of the use of EPDM is that this is likewise UV-resistant and therewith particularly long-lasting and highly flexible. Elastomers and/or rubber however possess a particularly high tensile strength. These advantages can be combined by the use of multi-component products from the described material and therewith further optimized.

It is further possible that the carrier layer is configured from a hard layer from plastic particularly polyester, polyurethane and/or PET (polyethylene terephthalate). Thereby with the use of polyester a very good form stability for the application of the image structure is preferable. Polyurethane possesses a very high tensile strength, wherein PET has a good form stability and breaking strength even with high temperatures. The melting point of PET which is 250° C. to 260° C. is further particularly suitable for a 3D-printing method. or similar processing methods with high temperatures. Further preferably the carrier layer can be configured with a plastic with a melting point over 300° C. Therewith a damage of the carrier layer with the application of the image structure can be prevented.

The carrier layer thereby comprises a higher hardness than the elastic layer and possesses a smaller elasticity and for example a higher strength (for example pressure, compression and/or bending strength). Likewise it is possible that the carrier layer comprises a coating wherein the coating comprises for example a higher strength and/or hardness than the inner material of the carrier layer. Further, the carrier layer can at least on one side comprise an outer layer for example a flexible, elastic and/or glueing outer layer. Likewise the outer layer on which the image structure is configured can particularly be configured such that a simple removing (peeling) of the applied image structure is possible. This is enabled by an adhesion failure due to the configuration of the carrier layer with a force influence. Thereby a reliable application of the image structure is enabled. Further, the carrier layer can particularly be suitable to configure an adhesion to the print image layer, when the carrier layer is configured from a plastic with high surface energy.

Preferably within the scope of the invention it can be intended that the elastic layer is made from a foam material, particularly polyurethane, polypropylene, polyethylene, polystyrene, PET and/or biopolymer. Further it is possible that the elastic layer is at least partially configured from polymers, from rubber and/or as a plastic tape. Likewise here advantages result like they are previously described for the carrier layer. Particularly with the use of plastics like PET, polyurethane or such like a damage of the elastic layer can be avoided when the plastics comprise a high tensile strength and form stability. PET further comprises a high melting point wherein a damage with high temperatures is avoided. Particularly elastomers for example from polyurethane are suitable due to their elastic properties and high tensile strength for the configuration of the elastic layer. Further polypropylene possesses a particularly high stiffness, hardness and strength and is therefore particularly suitable for the production of a foam material for the elastic layer. Likewise polyethylene, polystyrene and biopolymer are very suitable for the production of a foam material and further possess a low water intake, a good temperature resistance and a high toughness.

Further the elastic layer can be configured compressible wherein it is particularly suitable for the halftone printing. As an elastic and compressible layer the elastic layer of the base body deforms such that the so-called dot gain and therewith connected quality loss of the print can be reduced. The dot gain leads thereby to undesired effects during the printing process since the printing points are elastically widened. For reduction of the dot gain it can be provided for example that the elastic layer alternatively comprises a smaller compressibility than the carrier layer wherein if necessary the outer carrier layer comprises a corresponding higher elasticity than the elastic layer.

Further it can be intended within the scope of the invention that the elastic layer is configured as a one-sided or both-sided adhesive tape and/or comprises a one-sided or both-sided adhesive material. For retaining the carrier layer and/or for an arrangement at the sleeve the elastic layer can preferably be configured as an adhesive tape and/or comprise an adhesive material. Alternatively, the elastic layer can comprise further retaining or fastening means, like for example magnetized bodies and particularly ferromagnetic bodies. Therewith an arrangement by magnetisation can occur. In order to achieve a hard glueing, the elastic layer can comprise for example a thickness of mainly 0.1 mm and in order to enable a soft adhesion the elastic layer can for example comprise a thickness of mainly 0.2 mm to 1 mm. The described manner of the adhesion (hard or soft) thereby determines in a significant manner the existence of pressure peaks during the printing process and influences the printing quality. The adhesive material can for example be configured on basis of natural rubber, on basis of polyacrylics, on basis of block copolymer and/or on basis of acrylic. Therewith, the adhesive material provides a good and secure glueing, wherein the adhesive material is particularly suitable for the glueing on PET and can for example be removably configured. Further it is possible that the adhesive material, the adhesive tape and/or the elastic layer are configured self-adhesive, compressible and/or permanently adhesive. The surface of the elastic layer for example comprises a shrinkage-free and if necessary harder, more stable layer, in order to stabilize the foam material.

It can be another advantage within the scope of the invention that for the arrangement of the elastic layer an adhesive layer and/or for the arrangement of the carrier layer a second adhesive layer is provided, wherein particularly the first and second adhesive layers are configured as both-sided adhesive tape. It is therewith possible that for example only a first adhesive layer and/or only a second adhesive layer is provided, wherein the adhesive layers can be configured with different properties (for example a different thickness and/or a different material). Further, the adhesive layers can comprise features and details which are previously described in connection with the elastic layer and/or the adhesive tape. Hereby the advantage results that a secure fixation of the elastic layer and/or the carrier layer on the base body is enabled.

It is further possible that the elastic layer has a thickness of 0.1 mm to 2 mm, particularly from 0.5 mm to 1 mm and/or the carrier layer has a thickness of 100 µm to 1000 µm, particularly mainly of 300 µm and/or the print image layer with the image structure has a thickness of 0.1 mm to 10 mm, particularly mainly 0.5 mm to 1 mm. Likewise it can be intended that the base body comprises an extent of 250 mm to 1500 mm. By the described configuration of the base body preferable properties for the printing process are achieved, particularly for the reduction of the pressure peaks. Further, the described embodiment of the base body can filter certain disturbing oscillation frequencies of the base body or pressure cylinder which result during the rotation during the printing process and thus improve the printing quality and/or the lifespan. It is thereby possible that the thicknesses of the layers of the base body, for example within described limits for the thickness, are adjusted to the properties of the used printing machine and for example the printing cylinder (for example the extent) in order to achieve an optimal frequency filtering.

Preferably, it can be intended within the scope of the invention that data, particularly digital parameters, are transferred from an information device of the base body by a communication unit to a communication device of the printing form machine according to the invention. The information device of the base body thereby serves particularly for the data exchange with the printing machine and/or with the printing form machine according to the invention. Thereby, the communication unit of the information device can be suitable, particularly for the contactless data transfer according to a RFID (Radio Frequency Identification), NFC (Near Field Communication) and/or Bluetooth standard. Further, the base body can if necessary comprise a non-volatile memory unit, wherein the non-volatile memory unit comprises an identification code particularly for the distinct identification of the base body at the printing machine. Hereby, for example the base body, a priming machine as well as at a printing form machine according to the invention can be distinctly identified and for example in dependence on the identification code, a determined processing method, separation method and/or a certain material type can be used. Further, it is possible that the non-volatile memory unit is described with data, particularly digital parameters, by the printing form machine according to the invention and/or by the printing machine. In this manner an automated production and integration of the image structure in the printing process can occur.

Further, within the scope of the invention it can be intended that by the processing device the base body and/or the carrier layer are provided with an elastic layer, wherein the elastic layer is particularly suitable for retaining the carrier layer at the base body. Hereby, the printing form machine with the processing device according to the invention is able to prepare the base body for the acceptance of the image structure and particularly likewise to generate the image structure. Thus, a single printing form machine according to the invention can be provided for a plurality of necessary working steps.

Likewise subject matter of the invention is a printing form machine for the generation of a print image structure according to the print image specification, particularly for a letterpress method and/or an intaglio printing method, particularly for a flexoprint, with an processing device for the generation of the image structure by the adaptation of a material, and a control device for controlling the processing device, wherein the processing device is configured such that the image structure is generatable from the material according to the print image specification. Therewith, the printing form machine according to the invention provides the same advantages like they are described in detail for the method according to the invention. Further, the printing form machine can be suitable to be operated with a method according to the invention and/or performed with a method according to the invention.

The printing form machine according to the invention thereby comprises for example a 3D-printer which generates a three-dimensional structure on the basis of a print image specification (like a CAD file with a specification for the subsequent print image). Hereby, particularly the image structure is configured which is suitable to transfer the print image to a printing substrate in a printing process. The print image specification can thereby be configured digital, for example saved in a non-volatile memory device of the printing form machine according to the invention. For the generation of the image structure the printing form machine according to the invention comprises particularly an processing device for an additive, subtractive and/or forming processing method like for example forming process and/or for a graving. Thereby, the printing form machine according to the invention is particularly characterized in that a fast and cost efficient adjustment and/or generation of the image structure particularly directly on the base body is performable.

Advantageously, it can be intended within the scope of the invention that a non-volatile memory device of the printing form machine according to the invention is provided, which comprises a print form specification and particularly digital parameters for the generation of the image structure on a base body. The digital parameters can thereby for example be saved by an external data processing device in the non-volatile memory device and/or can be transferred particularly contactless from a base body to a printing form machine according to the invention. Thereby, the base body comprises particularly a non-volatile memory unit, wherein likewise the non-volatile memory unit comprises digital data with information about the print image, the print image specification and digital parameter particularly with processing information for a processing method and/or for a printing form machine according to the invention. The digital data can remain saved subsequent to the transfer of the base body to the printing form machine according to the invention for example in a non-volatile memory unit particularly for the duration of the generation of the image structure by the printing form machine according to the invention. Further, the printing form machine according to the invention can control and adjust the generation of the image structure using the transferred or saved data.

Preferably, it can be intended with the printing form machine according to the invention that a control device is provided with a communication device for the data transfer, particularly for the data transfer with the base body and/or with the print machine. For the data transfer thereby preferably a radio connection for example with the printing machine and/or the base body can be provided. Hereby, a contactless data transfer is possible, wherein the data, particularly the digital data, comprises information about the print image and/or the digital parameters. Thereby it is possible that the communication device is suitable for the contactless data transfer according to a communication standard like RFID, NFC or Bluetooth. Therewith, a secure and reliable data transfer for example a sending to the printing machine and/or to the base body and/or a receiving of the printing machine and/or the base body is possible. The communication device can for the data transfer for example communicate with the communication unit of the base body, wherein the communication unit comprises for example a transponder for the contactless energy transfer and the communication device is suitable to operate the communication unit by the induction of a tension to an electromagnetic field. Further, likewise a radio connection for the data transfer like for example HF (High Frequency) or LF (Low Frequency) can be provided. Therewith, a secure and reliable transfer of data between the different machines is possible in order to enable a simple automatization.

Further, according to a preferred embodiment of the printing form machine according to the invention it can be intended that the non-volatile memory unit of the printing form machine according to the invention comprises an identification code for the distinct identification of the base body. The memory device can for example be a data carrier like a hard disk, a flash memory, SD memory (Secure Digital Memory Card), a SSD memory (Solid-State Drive) and/or EPROM (Erasable Programmable Read-Only Memory). Therewith, a durable saving of the identification code and/or other digital data like digital parameters is possible independently from the power supply. Further, the memory device can comprise the print image which for example is provided in a STL format (Surface Tessellation Language) and/or another CRD format in the memory device. Likewise, the digital data can be saved at least partially encrypted. Hereby, a communication with the different base bodies and printing machines is possible since different formats and encryptions can be supported.

It is further possible that the processing device comprises an energy source, particularly a laser source, wherein a processing method particularly a 3D printing method and/or a graving is performable. Hereby, higher temperatures for example for melting or sintering can be generated and therewith the material can be reliably adapted. In order to achieve a possibly accurate generation of the image structure an optical device can be provided in order to focus the radiation of the energy source on a possibly small area on the base body or the carrier layer. The energy source can thereby for example be an energy source for the generation of thermal energy, UV-radiation source, a CO2-laser, a ND:YAG-laser or another gas or solid body laser which particularly achieves an output power of up to 1 kW (Kilowatt), 10 kW, 50 kW, 1 MW (Megawatt) or 2 MW. In this manner the material can be fast and reliably heated and a fast and qualitatively high graded generation of a image structure can be enabled. Further, it is possible that at least a diode laser is used, wherein the costs for the energy source can be significantly reduced. Further, it is possible that different energy sources and therewith at least two energy sources are provided, wherein for example a first processing device comprises a first energy source and a second processing device comprises a second energy source. Thereby, it is an advantage that different materials comprise a different absorption characteristic and therefore an energy source is not suitable for any material. By the use of different energy sources it is possible to choose a suitable energy source for the generation of the image structure, for example according to a specification and according to the used materials.

Advantageously it can be intended within the scope of the invention that the first processing device for pre-processing of the material and the second processing device for the fine finishing and/or graving of the material is provided. Hereby, the quality of the generated image structure can be significantly increased. Thereby, a first processing device can comprise for example a layer application unit for the layer application by an additive processing method and the second processing device can comprise for example an application unit for the processing method for the generation of the image structure, particularly a graving or fine processing. If necessary further a third processing device can be provided, which for example comprises an application unit for graving or cleaning unit for a cleaning.

In a further possibility the processing device can be controllable by the control unit such that the image structure is generatable on partial areas on the base body, wherein the partial areas are determinable by the evaluation unit according to the print image specification. In this manner the material effort can be reduced since only a image structure is generated and material for a further print image generation has to be attached, where according to the print image specification a image structure is necessary. The normally necessary complete coating with the print image layer is therewith omitted.

It is further possible that a first processing device is provided for an additive generation of the image structure and a second processing device for a subtractive generation and/or graving of the image structure. Thereby, the control device can control the processing device or processing devices if necessary such that a image structure is generatable for a letterpress method and/or intaglio printing method. Hereby, the printing form machine according to the invention is suitable for a plurality of applications.

Advantageously, within the scope of the invention it can be intended that by a control unit the material for a generation of the image structure is choosable and applicable in relation to the pre-determined parameter. The pre-determined parameter can thereby for example be saved as a digital parameter in the non-volatile memory unit. In dependence of the parameter the material can for example be configured according to material properties like flexibility, elasticity and resistance and/or the stability of the material. The choice of the material can occur in dependence of a specification if a letterpress or graving press form should be generated, wherein with a letterpress form the material is particularly chosen flexible and with a intaglio printing form the material is particularly harder than with a letterpress form. The printing form machine according to the invention is therewith usable with different printing methods and different printing machines.

It is further possible that the printing form machine according to the invention comprises a transport device for the movement of the base body and/or the image structure. Hereby, a further automatization is enabled in order to further reduce the necessary duration for the generation of the image structure. Thereby, the transport device can comprise particularly at least a transport belt, a stacking device and/or an industrial robot arm in order to therewith for example move the material and/or the printing form and/or the base body. The transport device comprises if necessary a conveying unit such that at least with the conveying unit an introduction of the base body or the sleeve from for example a base body storage for the adaptation with the printing form machine according to the invention is possible.

Advantageously, within the scope of the invention it can be intended that the printing form machine according to the invention comprises a guidance device, particularly a linear guidance, wherein particularly the processing device is movably assembled at the guidance device. The processing device can particularly be assembled revolver-like at a transport chain of the guidance device and/or at the linear guidance of the guidance device. Thereby, the guidance device is particularly configured such that a form and/or force fitting retaining of the processing device or processing devices is possible. The processing devices can therewith be reliably positioned for a processing of a material at certain positions of a base body.

According to a preferred embodiment of the invention it can be intended that at least two processing devices are provided, wherein the processing devices are movable particularly by a guidance device. Thereby, the processing devices can be configured movably particularly independent from one another. Likewise, the guidance device can for example be configured revolver-like as a transport chain and/or as a linear guidance, wherein a space saving arrangement of the processing device and a reliable positioning of the processing device at for example a base body and/or a carrier layer and/or a print image layer for the generation of the image structure is possible.

Likewise, a base body for the adaptation by a method according to the invention and a priming machine particularly with a printing form machine according to the invention is protected. Thereby, the printing machine and the base body according to the invention comprise the same advantages like they are described in detail in relation to the method according to the invention and the printing form machine according to the invention. Thereby, features and details which are described in connection with the method according to the invention and the printing form machine according to the invention naturally also occur in connection with the base body according to the invention and the printing machine according to the invention and vice versa such that according to the disclosure to the single aspects of the invention it can always be reciprocal related.

BRIEF DESCRIPTION OF THE DRAWINGS

Further advantages, features and details of the invention result from the subsequent description in which in relation to the drawings embodiments of the invention are described in detail. Thereby, the features described in the claims and in the description can be essential for the invention each single by themselves or in any combination. It is shown:

FIGS. 4a-4c is a further schematic representation of a base body, FIGS. 9*a*-9*c* is a schematic representation of a guidance device of a printing form machine according to the invention according to different embodiments, FIG. 12 is a schematic representation for visualization of the method steps of a method according to the invention.

DETAILED DESCRIPTION

Figure 1:
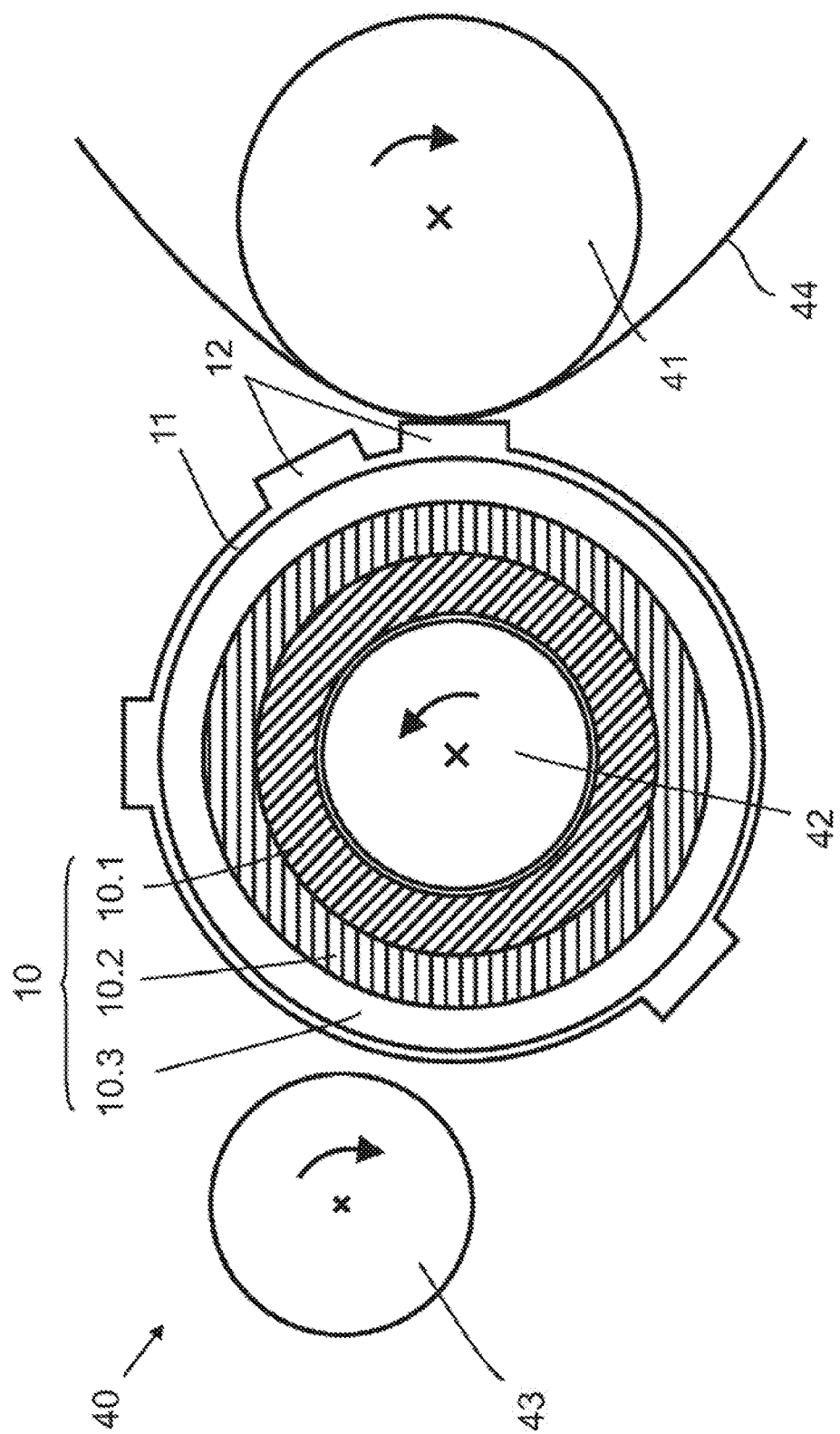
FIG. 1 is a schematic representation of a printing machine with a base body.

In FIG. 1 a printing machine 40 is schematically shown in its cross section, which comprises a counter pressure cylinder 41, a mandrel 42 and a thrust bearing 43. The printing machine 40 is thereby used for printing a printing substrate 44. Further, a base body 10 is shown which comprises a sleeve 10.1, an elastic layer 10.2 and a carrier layer 10.3. On the base body 10 a print image layer 11 with a print image layer 12 is applied, wherein the print image layer 11 with the image structure configure together with the base body 10 the print form cylinder of the printing machine 40. The printing substrate 44 thereby proceeds between the counter pressure cylinder 41 and the described print form cylinder such that by a contact pressure the print image is transferable to the printing substrate 44 via the image structure 12. With the shown printing machine 40 it is particularly a flexible printing machine and particularly a letterpress method. However, the subsequent embodiments shown in the figures can also be used for intaglio printing methods and other printing machines.

Figure 2:
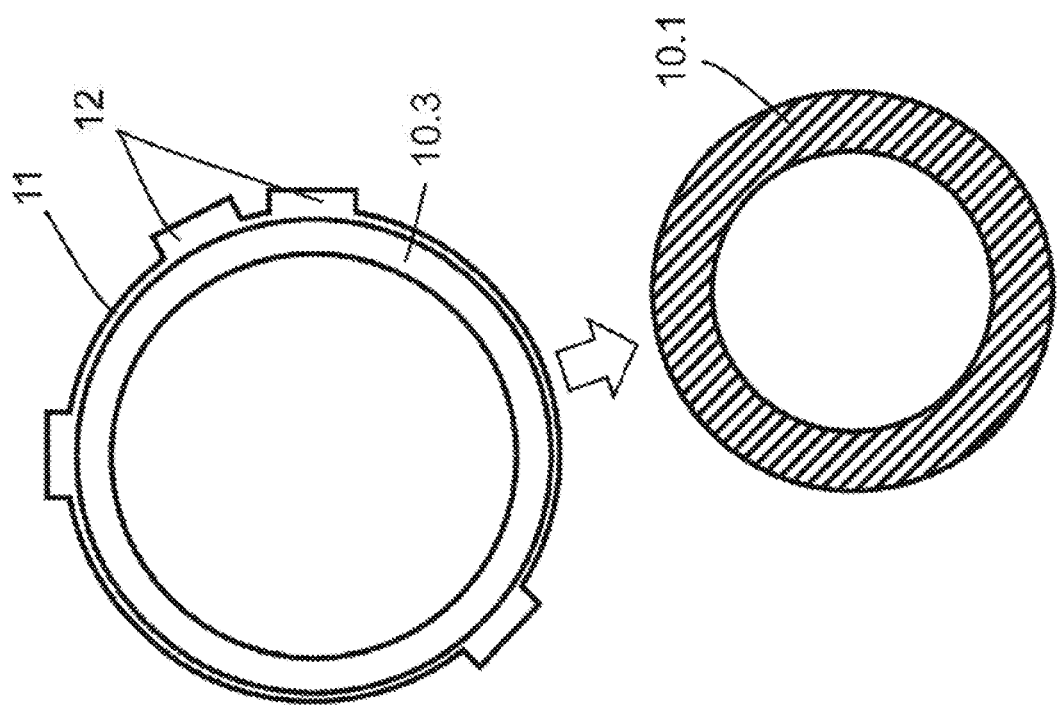
FIG. 2 is a schematic representation of a base body and an image structure.

In FIG. 2 it is shown that a printing form (which comprises a carrier layer 10.3 and a print image layer 11 with a image structure 12) can also be existent separately and manually and/or can be applied automatically to a sleeve 10.1 of a base body 10.

Figure 3:
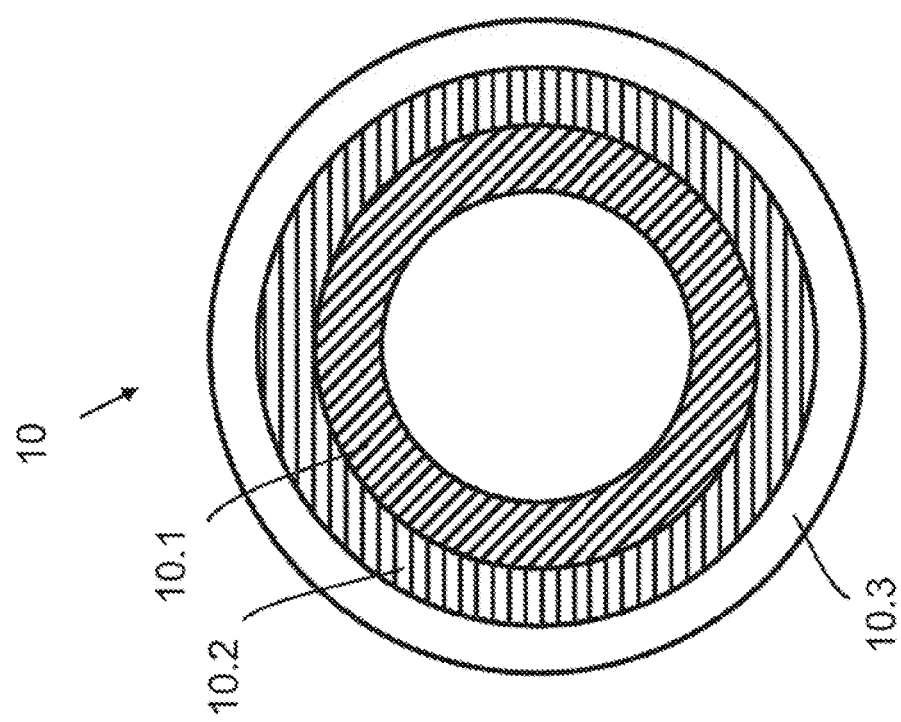
FIG. 3 is a further schematic representation of a base body with a carrier layer.

In FIG. 3 a base body 10 according to a further embodiment is shown, which comprises a sleeve 10.1, an elastic layer 10.2 and a carrier layer 10.3. The different layers are for example connected to one another via an adhesive material 10.4. Likewise it is possible that the base body 10 only comprises the sleeve 10.1 and/or a Sleeve 10.1, wherein the elastic layer 10.2 and/or the carrier layer 10.3 are applied for example by a printing form machine 50 according to the invention.

In FIGS. 4*a* to 4*c* a further schematic representation of a base body 10 is shown in the cross section. Thereby, the base body 10 comprises according to a further embodiment in FIG. 4*a* a sleeve 10.1 with an elastic layer 10.2, wherein hereby it is possible that with the generation of the image structure 12 the image structure 12 is directly applied to the elastic layer 10.1 or initially for example by a printing form machine 50 according to the invention a carrier layer 10.3 is applied to the elastic layer 10.2 and subsequently on the carrier layer 10.3 the image structure 12 with the print image layer 10 is generated. In FIG. 4*b*, however, a further embodiment of a base body 10 with only one sleeve 10.1 is shown. In FIG. 4*c* a base body 10 according to a further embodiment comprises a sleeve 10.1 and an elastic layer 10.2 and a carrier layer 10.3, which are connected by a first adhesive layer 10.5*a* and a second adhesive layer 10.5*b*. Further, alternatively for the connection of the elastic layer 10.2 with the sleeve 10.1 and for the connection of the carrier layer 10.3 with the elastic layer 10.2 an adhesive material can be used.

Figure 5:
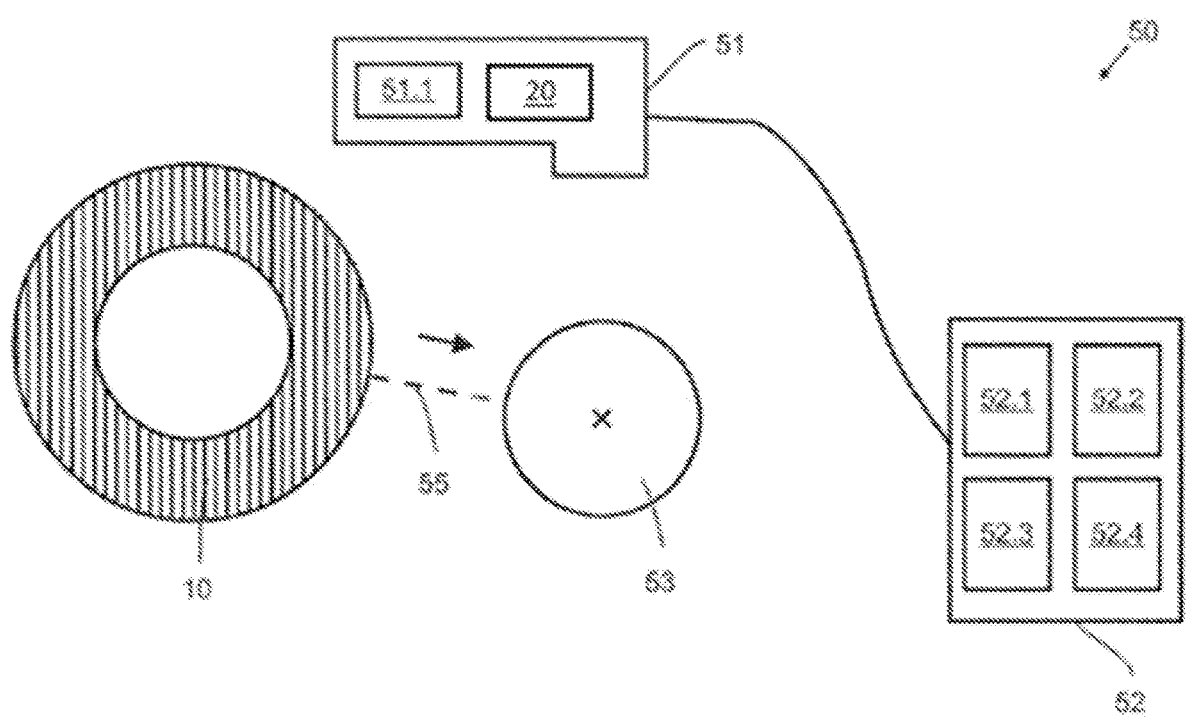
FIG. 5 is a schematic representation of a printing form machine according to the invention.

FIG. 5 shows a printing form machine 50 according to the invention according to a first embodiment. Therewith, a image structure 12 according to a print image specification 20 can be generated on a base body 10 initially the base body 10 is introduced for example via a transport device 55 in the printing form machine 50 according to the invention. Thereby, the base body 10 preferably is mounted to an acceptance 53, which can for example be configured as a mandrel 42. Likewise it is possible that the printing form machine 50 according the invention is integrated in the printing machine 40 and therewith for the generation of the image structure 12 the base body 10 can be applied directly on a mandrel 42 of the printing machine 40 of a printing form machine 50 according to the invention. In this case the acceptance 53 is identical with the mandrel 42 of the printing machine 40. The shown base body is configured according to a previously described embodiment for the base body 10, such that it can comprise for example only a sleeve 10.1, a sleeve 10.1 with an elastic layer 10.2 or a sleeve 10.1 with an elastic layer 10.2 and a carrier layer 10.3. Likewise another embodiment of the base body 10 is possible or for example an operation of the printing form machine 50 according to the invention is provided without a base body 10. In the latter case, the generation of a separate print image layer 11 with a image structure 12 occurs which for example can be applied automatically by the printing form machine 50 according to the invention or manually to a base body 10. For the control of the application process and the generation of the image structure 12 further a control device 52 of the printing form machine 50 according to the invention is provided, which comprises an evaluation device 52.1, a non-volatile memory device 52.2, a communication device 52.3 and/or an interface device 52.4. The evaluation device 52.1 is thereby for example suitable to read out digital data, to process it of the non-volatile memory unit 52.2 and to control an processing device 51 in dependence of the digital data (for example of digital parameters). Thereby, the evaluation device 52.1 is configured for example as a micro controller, processor and/or such like. The digital data can thereby for example by the communication device 52.3 be transferred to the printing form machine 50 according to the invention and saved in the non-volatile memory unit 52.2. Further, a cross section device 52.4 is provided, wherein digital data and/or control commands from an external data processing unit can be transferred to the printing form machine 50 according to the invention. By the described data transfer a read out and a receiving of the data is possible. The processing device 51 comprises an energy source 51.1, which is for example suitable to emit a radiation for the heating of a material 13 for the generation of the image structure 12. Further, the processing device 51 can comprise a not shown optical device for conducting and/or focusing of the radiation. Thereby, the optic device with the use of an energy source 51.1 which is for example configured as a $CO_2$-laser comprises for example a mirror and with the diode laser particularly lenses. Hereby, the radiation can be selectively directed to the desired position at the base body 10.

Figure 6A:
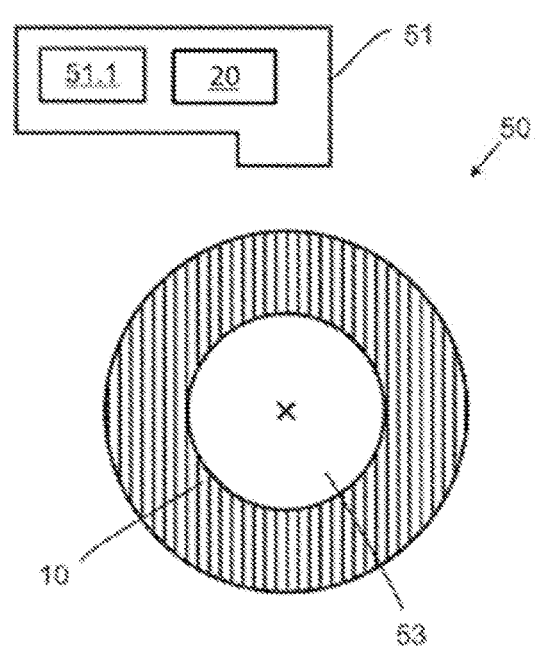
FIGS. 6a-6c is a further schematic representation of a printing form machine according to the invention.
Figure 6B:
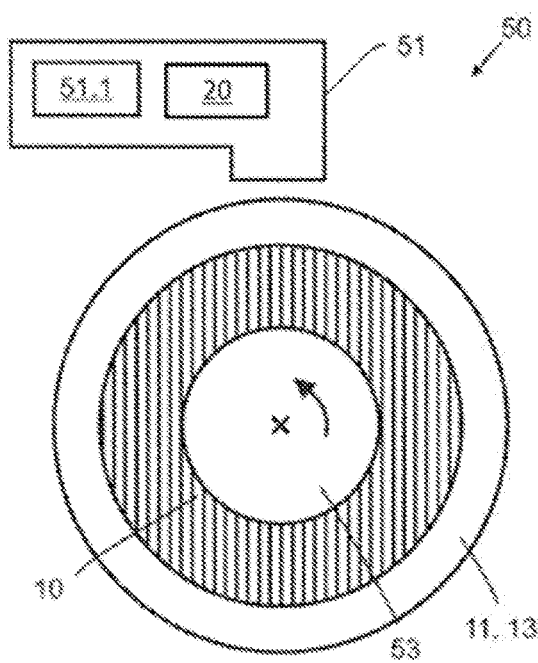
Figure 6C:
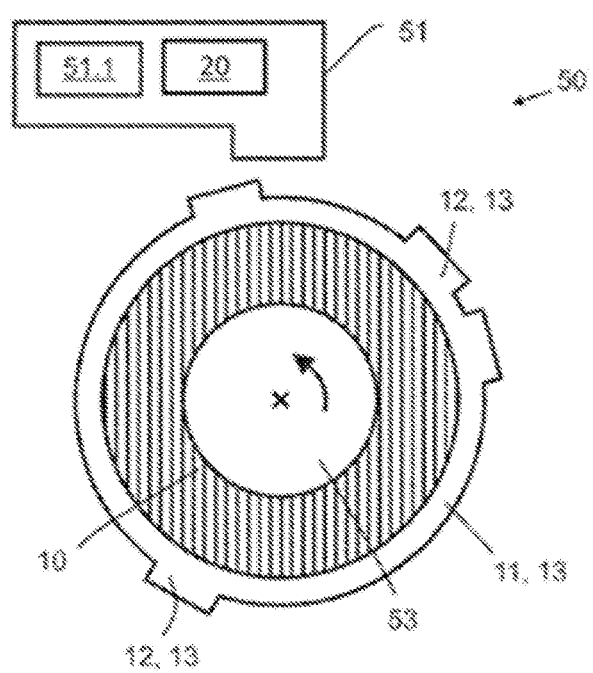

In FIGS. 6*a* and 6*c* different application steps for the generation of the image structure 12 are shown with a printing form machine 50 according to the invention. Thereby, in FIG. 6*a* it is shown that the base body 10 is introduced in a printing form machine 50 according to the invention, wherein in FIG. 6*b* material 13 is applied through the processing device 51 for the configuration of a print image layer 11 to the base body 10. As a subsequent step in FIG. 6c the generation of the image structure 12 from the print image layer 11 occurs in that by a subtractive method material 13 is removed at certain positions of the print image layer 11 according to the print image specification 20.

Figure 7:
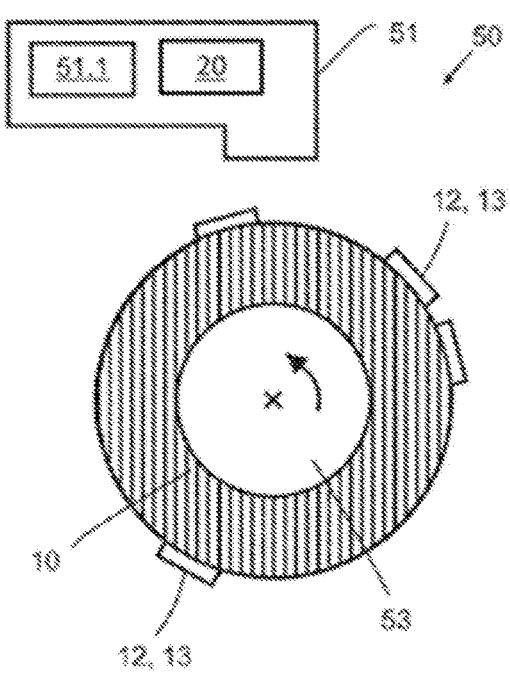
FIG. 7 is a schematic representation of a printing form machine according to the invention according to a further embodiment.

In FIG. 7 a further embodiment of a printing form machine 50 according to the invention is shown, wherein here an additive processing method is used. After the introduction of the base body 10 into the printing form machine 50 according to the invention, like it is shown in FIG. 6a, here no complete application of the print image layer 11 occurs. Instead here only in certain positions of the base body 10 according to a print image specification 20 material 13 is applied for the generation of the print image layer 11 with the image structure 12. Further it is possible that like in FIG. 6c a complete application of the print image layer 11 occurs, wherein subsequently further material 13 is applied for the configuration of elevations for the image structure 12.

Figure 8A:
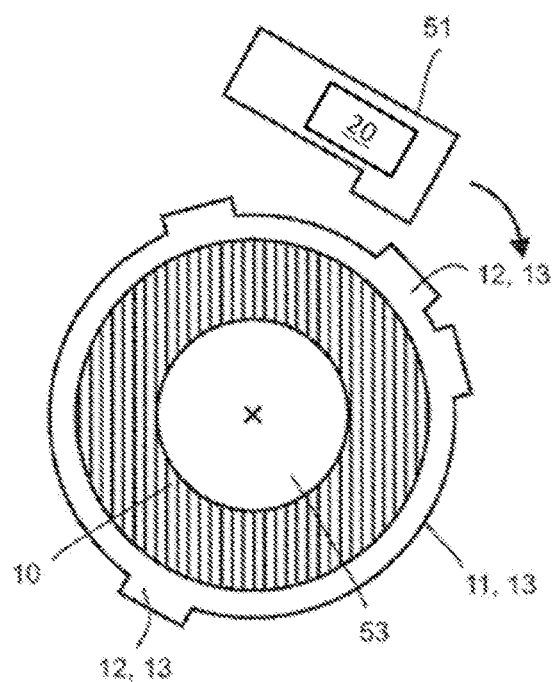
FIGS. 8*a*-8*b* is a further schematic representation of a printing form machine according to the invention according to a further embodiment.
Figure 8B:
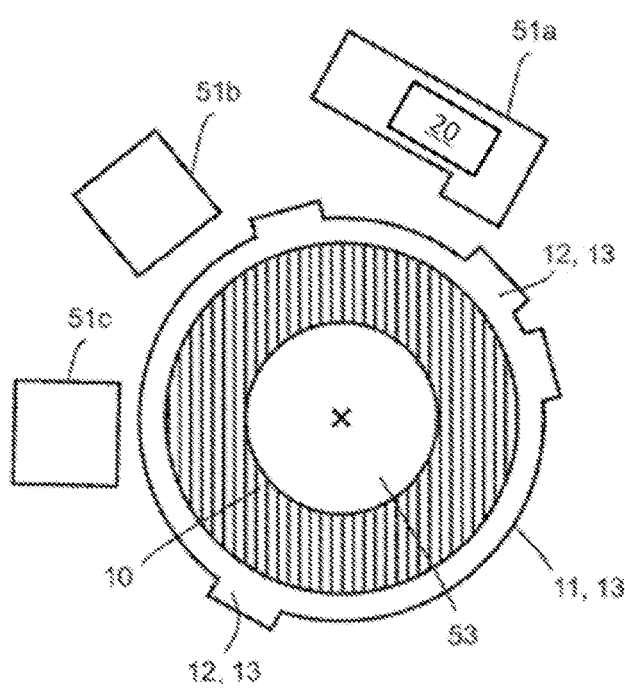

Further, like indicated in FIGS. 6b, 6c and FIG. 7 by an arrow, for the control of a position at which material 13 is applied for the generation of the image structure 12 the base body 10 is turned according to the print image specification 20. Alternatively, like shown in FIGS. 8a and 8b it is shown that processing devices 51 move at positions at the base body 10 at which according to the print image specification 20 an elevation should result and a material 13 should be removed. Thereby, like shown in FIG. 8b multiple processing devices 51 can be provided. For example here a first processing device 51a, a second processing device 51b and a third processing device 51c are shown. Thereby, the first processing device 51a can serve for example for the application of material 13 for the additive generation of the image structure 12, a second processing device 51b can be provided for the removal and/or graving of the image structure 12 and a third processing device 51c can show a cleaning unit for cleaning and/or removal for example for the performance of a removal and/or cleaning process. Further, it is alternatively possible that the first processing device 51a serves for an application of the print image layer 11, an elastic layer 10.2 and/or a carrier layer 10.3, a second application unit 51b serves for the generation of a image structure 12 by the application of material 13 and/or a removal of material 13 and a third processing device 51c serves for the performance of a removing and/or cleaning process. Further, the first processing device 51a comprises a layer application unit 50.1, the second processing device 51b, an processing unit 50.2 and/or a third processing device 51c a cleaning unit 50.3. Further, it is possible that with different processing devices different processing methods can be performed.

In FIGS. 9a to 9c different embodiments of a guidance device 54 of a printing form machine according to the invention are shown. Thereby according to FIG. 9a the guidance device 54 can be configured revolver-like such that different parts of the printing form machine 50 according to the invention can be circularly assembled and/or movable about a base body 10. These for example at the guidance device 54 form and/or force fitting arranged parts can be for example an processing device 51 or like shown a layer application unit 50.1, an processing unit 50.2 or a cleaning unit 50.3. The layer application unit 50.1 thereby serves for the application of material 13 for example for the generation of a print image layer 11 or for the configuration of elevations for an additive processing method for the generation of the image structure 12. The processing unit 50.2 thereby serves for example for the removal and/or elimination of material 13 for example for a subtractive processing method and/or for graving or for the performance of an additive processing method for the application of material 13 for the generation of the image structure 12. The cleaning unit 50.3 serves particularly for the performance of a removal and/or cleaning process. Alternatively, like shown in FIG. 9b an assembly and movement by a transport chain or like shown in FIG. 9c by a linear guidance is possible.

Figure 10B:
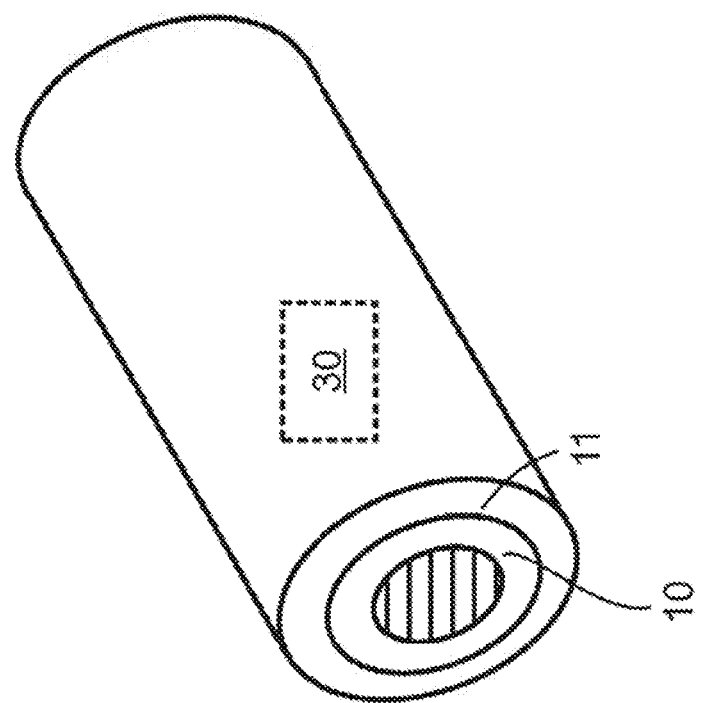
FIGS. 10*a*-10*b* is a schematic representation of an information device.
Figure 10A:
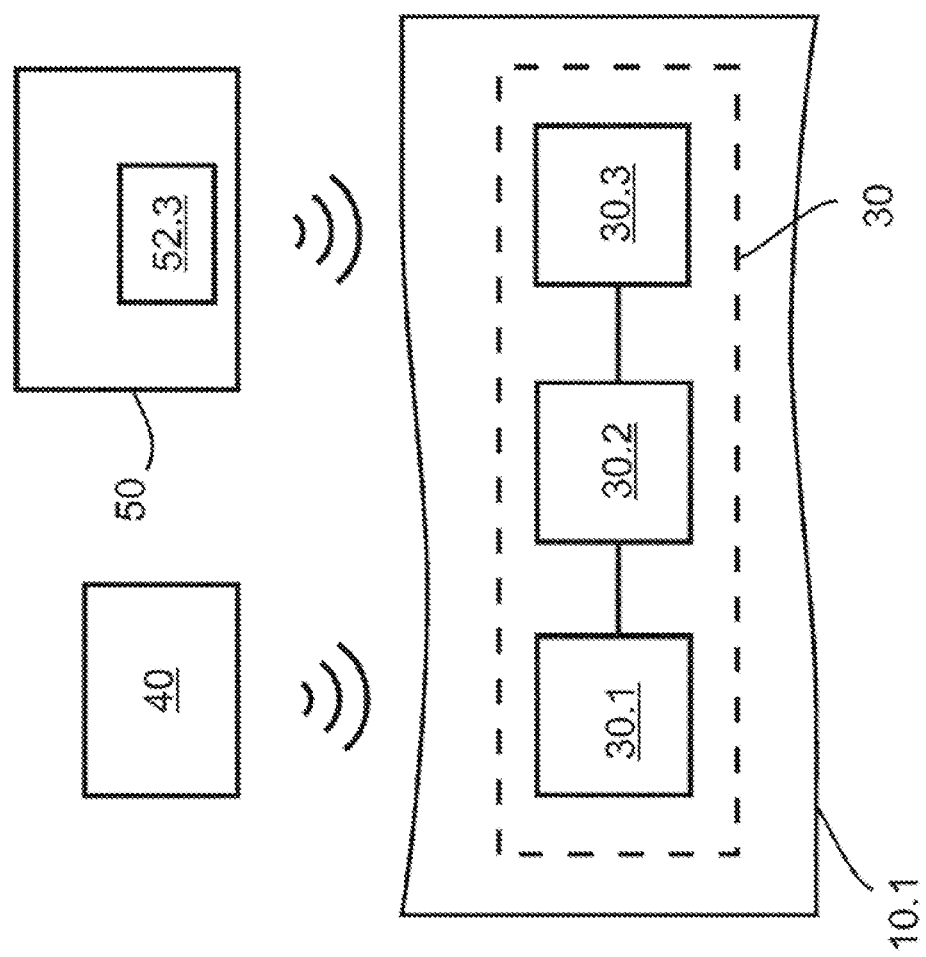

In FIGS. 10a and 10b an information device 30 of a base body 10 is shown, which is shown in FIG. 10b and can be integrated in the base body 10. The information device 30 comprises for example a communication unit 30.1, which particularly can be configured as a RFID unit with a corresponding transponder. Hereby, a communication with the printing machine 40 and/or with a printing form machine 50 according to the invention is possible, which for this purpose further comprises a communication device 52.3. The communication thereby occurs for example for the data exchange of digital data like digital parameters with specifications for example for the production process for the generation of the image structure 12. The digital data can for example thereby comprise the print image specification 20 and/or material properties and/or dimensions or tolerances for example of the base body 10 or a printing machine 40. The data can after the receiving be saved in the non-volatile memory unit 30.2 of the information device 30 via the communication unit 30.1 and be evaluated and processed by the evaluation unit 30.3.

Figure 11:
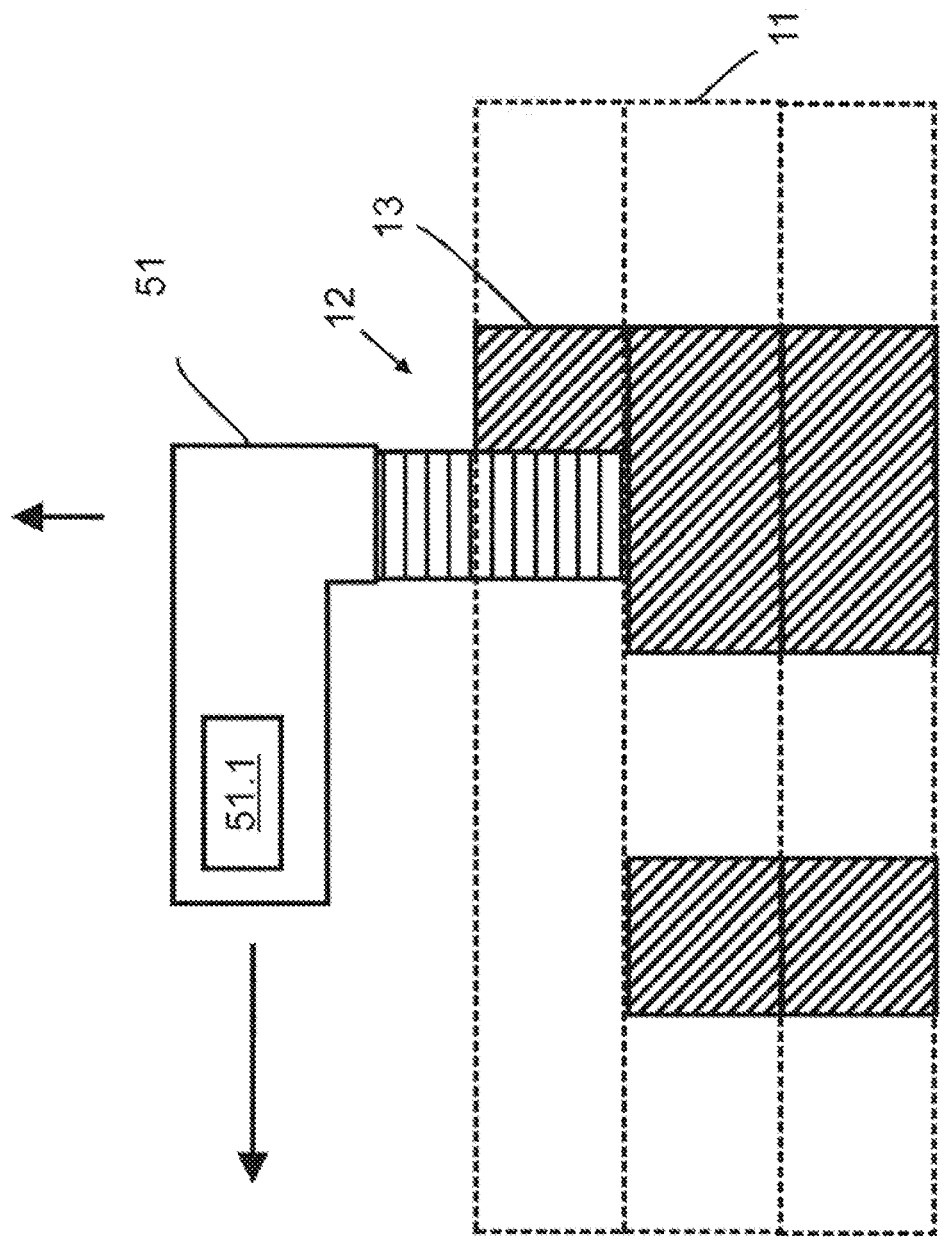
FIG. 11 is a schematic representation of parts of a printing form machine according to the invention.

In FIG. 11 it is schematically shown how a image structure 12 can be generated in a print image layer 11 by an processing device 51 of a printing form machine 50 according to the invention. Thereby, material 13 is applied and/or molten by a beam emitted energy source 51.1 or material 13 is removed from the print image layer 11. The application of material 13 for example according to an additive processing method can thereby occur layer-wise such that the print image layer 11 with the image structure 12 is configured layer by layer. This is shown in FIG. 11 by the dashed line. The possible movement directions of the processing device 51 are shown by two arrows, wherein the processing device 51 is movable by a drive like an engine in the guidance device 54.

In FIG. 12 a method 100 according to the invention is schematically visualized. Thereby, in a first method step 100.1 the provision of the base body 10 occurs. As a second method step 100.2 the application of material 13 to the base body 10 occurs, wherein in a third method step 100.3 the applied material 13 is processed for example according to a subtractive and/or additive processing method. Hereby, the image structure 12 is generated on the base body 10.

The previous description of the embodiments describes the present invention only within the scope of examples. Naturally, single features of the embodiment as far as technically meaningful can be freely combined with one another without leaving the scope of the present invention.

REFERENCE LIST

10 Base body
10.1 Sleeve
10.2 Elastic layer
10.3 Carrier layer
10.4 Adhesive material
10.5a First adhesive layer
10.5b Second adhesive layer
11 Print image layer
12 image structure 13 Material
20 Print image specification
30 Information device
30.1 Communication device
30.2 Non-volatile memory unit
30.3 Evaluation unit
40 Printing machine
41 Counter pressure cylinder
42 Mandrel
43 Thrust bearing
44 Printing substrate
50 Printing form machine
50.1 Lower application unit
50.2 processing unit
50.3 Cleaning unit
51 Processing device
51a First processing device
51b Second processing device
51c Third processing device
51.1 Energy source
57 Control device
52.1 Evaluation device
52.2 Non-volatile memory device
52.3 Communication device
52.4 Interface device
53 Acceptance
54 Guiding device
55 Transport device
100 Method
100.1 First method step
100.2 Second method step
100.3 Third method step

We claim:

1. A method for the production of a 3D image structure according to a print image specification, wherein the subsequent steps are performed:
a) provision of a base body for the acceptance of an image structure,
b) generation of a 3D image structure on the base body such that a print image layer is configured with the 3D image structure on the base body, wherein the 3D image structure is additively generated by a printing form machine, wherein the 3D image structure is configured layer by layer to the base body, wherein according to step b) the image structure is generated in the printing form machine, wherein a carrier layer is additively generated by the printing form machine and the carrier layer is configured with the print image layer to the base body, and wherein the print image layer comprises a lower hardness than the carrier layer in order to ensure an optimal contact pressure during a printing process.

2. The method according to claim 1, wherein
according to step b) initially a material is applied to the base body and subsequently is adapted such that the 3D image structure results.

3. The method according to claim 1, wherein
according to step a) at least a removal or cleaning process is performed.

4. The method according to claim 1, wherein
subsequent to step b) a post-processing of the 3D image structure occurs.

5. The method according to claim 1, wherein
at least an elastic layer is generated by the printing form machine and at least the elastic layer is applied with the print image layer to the base body.

* * * * *

UNITED STATES PATENT AND TRADEMARK OFFICE
CERTIFICATE OF CORRECTION

PATENT NO. : 10,889,100 B2
APPLICATION NO. : 15/489558
DATED : January 12, 2021
INVENTOR(S) : Martin Krümpelmann et al.

It is certified that error appears in the above-identified patent and that said Letters Patent is hereby corrected as shown below:

In the Specification

Column 21, Line 21: Delete "57 Control device" and replace with --52 Control device--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*